Feb. 28, 1956  J. R. PERILHOU ET AL  2,736,890
COLOR-TELEVISION CAMERA DEVICE
Filed July 15, 1952  2 Sheets-Sheet 1

INVENTORS
JEAN ROBERT PERILHOU
BENNO FREDERIK JÜRGENS
JOHAN LODEWIJK HENDRIK JONKER
BY
AGENT

United States Patent Office 2,736,890
Patented Feb. 28, 1956

2,736,890

COLOR-TELEVISION CAMERA DEVICE

Jean Robert Perilhou, Johan Lodewijk Hendrik Jonker, and Benno Frederik Juergens, Eindhoven, Netherlands, assignors to Hartford National Bank and Trust Company, Hartford, Conn., as trustee Application July 15, 1952, Serial No. 298,943

Claims priority, application Netherlands July 28, 1951

7 Claims. (Cl. 340—369)

This invention relates to color-television camera devices and to camera tubes suitable for use in such devices.

There are numerous television cameras adapted to convert an optical image into an electrical image by a photosensitive target which can be scanned by an electron beam to produce a corresponding electrical image. In certain of those cameras, the target plate stores a charge for each elemental area corresponding to the amount of light incident thereon so that an electrically stored image appears upon the target plate. By scanning the target with an electron beam, an electrical signal can be produced in which light variations on the photo-sensitive surface correspond to electrical voltages of varying amplitude.

The present invention relates to an improvement in television cameras of the latter type wherein such a camera is adapted to reproduce not only variations in light intensity in the optical image but also differences in color.

According to the invention, a color filter comprising a plurality of strips of $n$-different color absorption characteristics occurring in a given sequence is mounted in front of the photo-sensitive target so that the target is not only responsive to variations in light intensity for a given color but it is also made responsive to the spectral distribution of the light incident thereon. In order to read the target plate to produce an electrical signal containing the information regarding the intensity and spectral distribution of the light incident thereon as represented by the storage level in each elemental area thereof, there is provided an electron gun for producing an electron beam including an accelerating anode, suitable deflection means for causing the beam to traverse successive groups of strips of the target plate, and a pair of special coacting spaced grids interposed between the accelerating anode and the target plate at substantially right angles to the direction of the electron beam to permit a particular elemental area of a particular strip of each group to be scanned in correct sequence to thereby discharge the elemental areas in each strip through an impedance.

Each of the grids comprises a plurality of parallel wires with each of the wires of the second grid, i. e., the grid furthest from the accelerating anode, being located behind the center of each of the apertures formed by two adjacent wires of the first grid. The grids are maintained at potentials at which the electron beam is converged after passing therethrough and at which the width of each ray, measured at right angles to the direction of the grid wires at the area at which the beam strikes the target plate, is not more than two-thirds the width of the beam at the area of the first grid. Means are also provided to supply an alternating current voltage to at least one of the grids so that a different strip of the target plate may be struck by the beam.

For the camera according to the invention to operate, an electrostatic field must exist behind the grids, i. e., on the side of the second grid remote from the source of electrons. For this purpose, the camera may be provided with an additional electrode, i. e., a field electrode, behind the grids, so that an electrostatic field can be produced between the grids and this electrode. In one form, the target can operate as the field electrode so that, in this case, the target and the field electrode will be integral with one another. In other cases, the field electrode may be shaped in the form of a grid and positioned between the target and the second grid.

The invention will now be described with reference to the accompanying drawing in which.

Figures 1, 3:
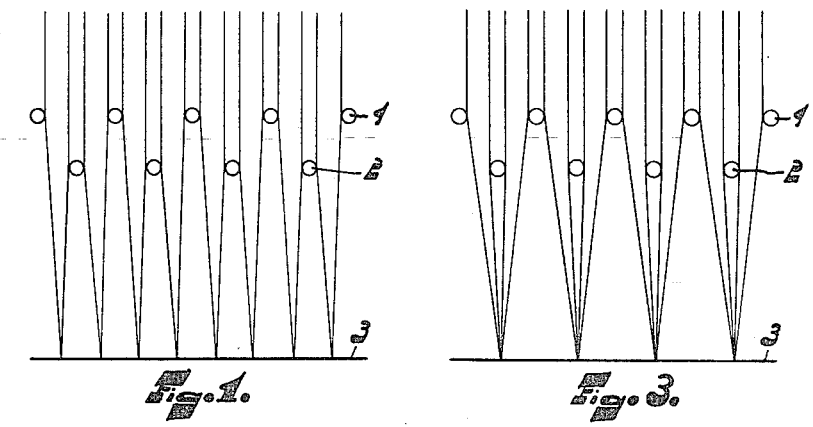
Figs. 1, 2 and 3 are simplified diagrammatic views illustrating the principles underlying the invention.

Fig. 1 illustrates the principle of the invention in which two grids 1, 2 having only parallel wires at right angles to the plane of the drawing, are arranged in front of a target 3 which is integral with a field electrode. The wires of the second grid 2 are located behind the center of each of the apertures formed by two adjacent wires of the first grid 1. This is to be understood to means that the wires of the second grid must be located on a line that could be drawn through the point of deflection of the beam and the center of the aperture of the first grid.

The first grid 1 is struck by an electron beam having a sectional area in the plane of that grid which is so large that several wires of the grid 1 are embraced by the beam. For purposes of simplicity it is assumed that the size of the beam section at right angles to the plane of the drawing is very small. The electron beam is divided by the two grids 1 and 2 into a number of rays, i. e., the rays are formed; it can be said, between a wire of the first grid and a wire of the second grid, which is equal to twice the number of apertures of that part of the first grid through which the electron beam passes.

In order to cause the rays to converge toward the target 3, voltages are supplied to the grids and the target at which the voltage of the grid having the lower voltage is not more than the voltage on the target and at which the two grids have a voltage exceeding the voltage on the cathode of the electron gun supplying the beam of electrons. However, this alone, does not guarantee that convergent rays are obtained. In addition, the voltages on the electrodes and the distances therebetween must be arranged so that in the following equation $f$ exceeds zero:

$$\frac{1}{f} = \frac{1}{f_1} + \frac{1}{f_2} \quad (1)$$

In this Equation 1, $$f_1 = \frac{2V_{g1}}{\frac{V_{g2} - V_{g1}}{l_2} - \frac{V_{g1} - V_k}{l_1}} \quad (2)$$

and $$f_2 = \frac{2V_{g2}}{\frac{V_s - V_{g2}}{l_3} - \frac{V_{g2} - V_{g1}}{l_2}} \quad (3)$$

where:

$V_k$ is the voltage of the electrode immediately preceding the first grid, usually, the accelerating anode of the electron gun;
$V_{g1}$ is the voltage of the first grid;
$V_{g2}$ is the voltage of the second grid;
$V_s$ is the voltage of the target;

$l_1$ is the spacing between the electrode preceding the first grid and the first grid, $l_2$ is the spacing between the first grid and the second grid, $l_3$ is the spacing between the second grid and the target, $f_1$ is the focal distance of the lenses formed by the first grid, and $f_2$ is the focal distance of the lenses formed by the second grid.

From the above Equations 1, 2 and 3, it is evident that the focal distances of the rays varies with the voltages on the grids, the target and the electrode immediately preceding the first grid; however the absolute voltages are not the test, the voltage ratios are, as is the case with any electron-optical system. In order to simplify the explanation of the operation of a device according to the invention, it is assumed hereinafter that the voltages on the target or field electrode and the electrode immediately preceding the first grid, usually the accelerating anode, are constant and that only the voltages on the grids are varied.

If the voltages at the grids are varied within the requirements referred to above not only a variation of the focal distance but also a displacement of the foci occurs in a manner at which the foci of two rays located on different sides of a wire of the second grid 2 move in opposite senses. This displacement may be represented by the following equation, if the variations of $V_{g1}$ and $V_{g2}$ are not too great:

$$v = \frac{d}{4}\left(\frac{l_2+l_3}{f_1} - \frac{l_3}{f_2}\right) \tag{4}$$

where $d$ is the distance between two adjacent wires of a grid.

The foci of the rays may, of course, be located in front of, on or behind the target. For the sake of simplicity it will furthermore be assumed that the foci are located on the target. If the voltages at the grids are adjusted to produce this result, an alternating control-voltage superposed on one grid voltage or on both the grid voltages will, as a rule, produce a variation both of the focal distance and of the area of the point of impact. From the above Equations 1, 2, 3 and 4, it can be readily shown that by supplying alternating voltages in phase opposition to the two grids, high control-voltages may be used so that a relatively large displacement of the points of impact on the target can be obtained without appreciable variation of the focal distance. The above formulas, equations and results are to be considered only as approximations. The only requirement is that the grids should produce convergent rays.

From the above description and equations, it is obvious that the spacings between the grids themselves and the field electrodes or the electrode preceding the first grid will affect the focal distance and the displacement of the point of impact on the target. In general, the spacing between the electrode preceding the first grid and the field electrode is chosen to be larger, preferably five times larger, than the spacing between the grids.

The beam division shown in Fig. 1 is produced when $$\frac{f_1}{f_2} = 1 + \frac{l_2}{l_3}$$

Figure 2:
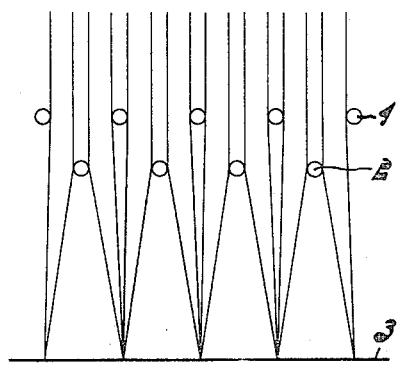

The displacement $v$, represented by Equation 4, is then zero. By supplying an alternating control-voltage to one grid or to both grids 1 and 2, the points of impact on the electrode 3 may be displaced. Fig. 2 illustrates a condition in which the points of impact are displaced without substantial variation of the focal distance and in which the displacement of the rays is such that two points of impact coincide behind a wire of the grid 1.

Fig. 3 shows a further particular condition in which two rays also coincide in one point, which, however, is located behind a wire of the grid 2. It is obvious that the displacement of the impact points can easily be varied between the two conditions shown in Figs. 2 and 3 by suitable variation of the voltages supplied to the grids.

Referring to Figs. 1 to 3, the beam traversing the grid 1 has a side at which several wires of the grid are embraced. In principle, however, the operation of the device remains exactly the same, if the beam section in the plane of the grids is smaller than the spacing between two grid wires. The target shown in Figs. 1, 2 and 3 may be arranged inside a camera tube and charges produced thereon by photo-electrons from a photo-cathode. If a color filter is provided in front of the photo-cathode, which is composed of strips of different color transmission, these charges will vary with the intensity of the color of the light transmitted. Consequently, the charges will be arranged on the target in the form of color lines such as a green line when the charges are produced by light transmitted through a green strip of the filter or blue or red lines or lines of other colors. When the voltages on the grids are constant and the beam is deflected in front of the grid 1 in a direction transverse to the direction of the grid wires, only strips of the same color will be struck on the target. By varying the grid voltages, other strips can be struck.

Figure 4:
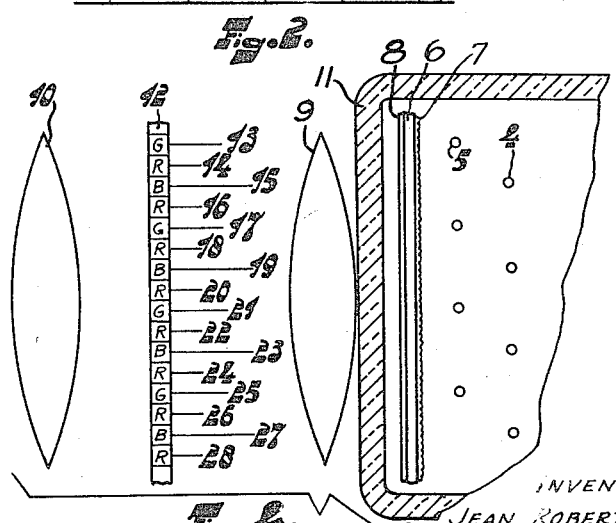
Fig. 4 is a simplified diagrammatic view of one form of a camera tube for transmitting colored television images.

Fig. 4 shows, in a very simplified manner, part of an iconoscope which is suitable for producing colored television images. The plane of the drawing is a sectional area at right angles to the direction of the wires of a pair of grids 4, 5 which correspond to the grids 1 and 2, respectively, shown in Figs. 1, 2 and 3. A target support 6 is coated on the side facing the grids with a photo-mosaic 7 and is also provided with a signal plate 8 on its other side. The signal plate 8 serves, at the same time, as a field electrode.

Both the support 6 and the signal electrode 8 are transparent and the target is separated from the remaining parts of the optical system by the glass wall 11 of an envelope. A filter 12 is arranged between optical systems 9 and 10; this filter is composed of strips 13 to 28 having different color transmissions which are arranged parallel to the grid wires; for example, the strips 13 to 28 may be composed of adjacently arranged colored glass strips. The photo-mosaic 7 is struck by light projected by the optical systems 9, 10, shown as lenses, through the filter 12 thereby producing on the photo-mosaic 7 an image which is subdivided into colored lines. By supplying suitable control-voltages to one grid or to both grids, the rays separated from the electron beam can be caused to strike definite lines, since the areas where the rays strike the target with definite grid voltages are fixed. Consequently, if at these areas there are lines of the same color, a signal is emitted, via the signal plate 8, reproducing both the color and the value of the potential of the point on the photo-mosaic 7 struck by the electron ray. The potential of the point varies with the intensity of the corresponding point of the light image of the scene to be transmitted produced by the optical systems 9 and 10 and with the color of the filter strip traversed.

If the electron beam is subdivided into rays as is shown in Fig. 1, only colored lines of the photo-mosaic are struck that are formed by the even-numbered color filter strips 14 to 28. With a subdivision as shown in Fig. 2, only color lines corresponding to the filter strips 13, 17, 21 and 25 are struck and with a subdivision as shown in Fig. 3, only those color lines that correspond to the filter strips 15, 19, 23 and 27 are struck.

In Fig. 4 in accordance with the conventional practice there are three series of filter strips, namely, red, green and blue. For example only, the red may be formed by the even-numbered filter strips; the green by filter strips 13, 17, 21 and 25; and the blue by filter strips 15, 19, 23 and 27. This, however, is not essential and, as an alternative, the number ($n$) of series may be chosen to be 2 or more than three.

Figure 5:
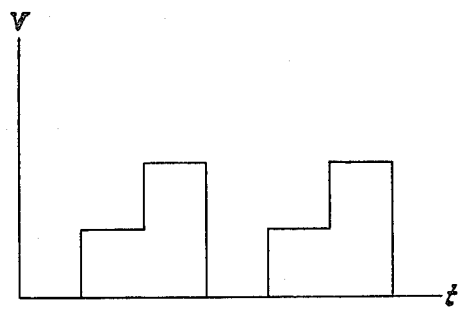
Fig. 5 shows a characteristic curve of the voltage supplied to a grid.

The three conditions illustrated in Figs. 1, 2 and 3 are obtained by definite voltages at the grids 4 and 5. For the production of colored television images, these voltages must occur in regular succession. This may, for example, be obtained by supplying a step-shaped wave form of voltage to one of the grids in the form shown in Fig. 5. In this figure, time is plotted on the abscissa of the graph and the voltage at the grid is plotted along the ordinate.

Scanning of the target plate may be obtained by two different methods. In one method, the direction of line deflection may coincide with the direction of the grid wires, or, in the other method, it may be at an angle thereto. The direction of line deflection is preferably chosen to be at right angles to the direction of the grid wires. The method in which the direction of line deflection is parallel to the grid wires will first be described.

The relation between the voltage variation at the grids 4 and 5 and the deflection of the beam in front of the grid may be chosen such that first all the green lines are scanned, so that a green image is produced, then all the red lines and then all the blue lines. In English and American literature this method of scanning is termed "field sequential" method. As an alternative, the relation may be chosen such that all the lines are scanned in succession. This may be termed "line sequential." With these methods of scanning, complete color lines are obtained. There is a third possibility, which is termed "dot sequential" in the English and American literature. This scanning method is carried out if the beam does not scan a full line, but leaps from one line to the other. Consequently, dots of different colors are struck in succession.

When the direction of line deflection is at right angles to the direction of the grid wires, the three aforesaid methods of scanning may also be carried out. With the "field sequential" scanning method, points of all the green lines are struck in succession when the beam describes one vertical line. Consequently, this is not a full line, but is composed of a number of dots. At the end of a line the beam flies back and starts scanning a new line. The voltage at the grids, however, remains the same, so that again only green dots are struck and a new green dotted line is reproduced. Not until the whole image is scanned is the voltage at one grid or at both grids varied and then only to describe red dotted lines. The result is that three images in the three colors are described in succession.

A "line sequential" scanning method is obtained, if the voltage at one grid or at both grids varies at the end of each vertical line. In this case, consequently, dotted lines of different colors are described in succession.

A composition according to the "dot sequential" system is obtained if the voltage at one grid or at both grids varies in a manner at which one ray is directed in succession to the three color lines. Consequently, a line composed of a series of differently colored dots is produced.

Figure 6:
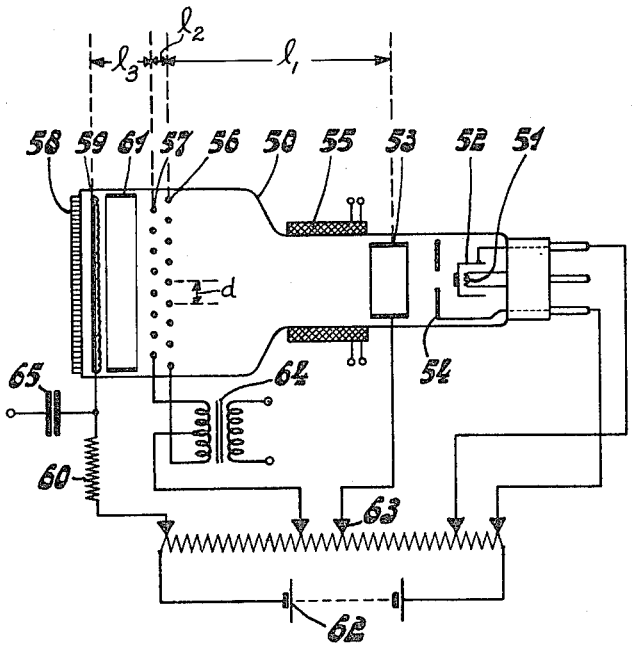
Fig. 6 is a view of one embodiment of a device according to the invention and the tube used therein, together with part of the circuit-arrangement required.

Fig. 6 shows, diagrammatically, a device according to the invention comprising an iconoscope together with a few important parts of the associated circuit-arrangement. The tube shown comprises an envelope 50 enclosing an electrode system comprising a cathode 52 heated by a filament wire 51, an accelerating anode 53 and an intensity control electrode 54 for producing an electron beam. The tube is further provided with a set of deflection coils 55 which serve to deflect the beam in two directions at right angles to one another. A pair of grids 56, 57, each comprising a plurality of parallel wires which are parallel to one another are arranged within the tube at right angles to the plane of the drawing. The front side of the tube is provided with a color filter 58 which projects a colored image subdivided into lines onto a target or field electrode 59. The latter comprises a transparent substratum provided, on the side facing the cathode 52, with a photomosaic. On the filter side of the target 59, there is provided a signal plate connected to a resistor 60 from which the signal voltages are taken via a capacitor 65. Reference numeral 61 designates a collector ring which is usually employed in an iconoscope. A source of direct voltage 62 is connected across a potentiometer 63 from which the voltages for the various electrodes are taken. A transformer 64 supplies the variable control voltages, the source of which may be any conventional square-wave generator producing step-shaped wave form pulses, in phase opposition to the grids 56 and 57.

The invention resides only in the particular method of control of an electron beam for scanning a target in a camera tube by means of two grids; consequently, it may be carried out also in iconoscopes differing from that described above, for example, in an orthicon, an image orthicon or a vidicon.

A further use for the device according to the invention is for transmitting stereoscopic images. In this case, use may be made of filters in two complementary colors or of polarisation filters as substitutes for the color filters shown in Figs. 4 and 6.

While we have thus described our invention with specific examples, and embodiments thereof, other modifications will be readily apparent to those skilled in the art without departing from the spirit and scope of the invention as defined in the appended claims.

What we claim is:

1. A color television camera device comprising a color filter constituted by a plurality of strips having different color absorption properties and periodically occurring in a given sequence, a photo-cathode sensitive to light rays passing through said filter, a target plate, a first source of potential, an electron gun including a cathode and an accelerating anode for producing an electron beam, means connected to said first source for applying a given potential to said cathode, a first grid comprising a plurality of parallel wires mounted between said accelerating anode and said target plate, a second grid comprising a plurality of parallel wires mounted between said first grid and said target plate, each of the wires of said second grid being parallel to the wires of said first grid and being located behind the center of an aperture formed by two adjacent wires of said first grid, means connected to said first source for applying potentials to said grids including a potential exceeding said given potential, means connected to said first source for applying a potential to said target plate at least equal to that applied to the grid having the lower potential, deflection means for causing the electron beam to scan the target plate, said target plate, grids and accelerating anode being spaced apart distances at which, with the potentials applied thereto, the beam forms at least one converging ray having a width measured at right angles to the direction of the grid wires at the area of impact on the target plate which is not more than two-thirds the width thereof measured at the area of the first grid, a second source of alternating control voltage, and means connected to said second source for applying an alternating control voltage in phase opposition to the two grids.

2. A color television camera device comprising a color filter constituted by a plurality of strips having different color absorption properties and periodically occurring in a given sequence, a photo-cathode sensitive to light rays passing through said filter, a target plate, a first source of potential, an electron gun including a cathode and an accelerating anode for producing an electron beam, means connected to said first source for applying a given potential to said cathode, a first grid comprising a plurality of parallel wires mounted between said accelerating anode and said target plate, a second grid comprising a plurality of parallel wires mounted between said first grid and said target plate, each of the wires of said second grid being parallel to the wires of said first grid and being located behind the center of an aperture formed by two adjacent wires of said first grid, means connected to said first source for applying potentials to said grids including a potential exceeding said given potential, means connected to said first source for applying a potential to said target plate at least equal to that applied to the grid having the lower potential, deflection means for causing the electron beam to scan the target plate, said target plate, grids and accelerating anode being spaced apart distances at which, with the potentials applied thereto, the beam forms at least one converging ray having a width measured at right angles to the direction of the grid wires at the area of impact on the target plate which is not more than two-thirds the width thereof measured at the area of the first grid, means to produce a step-shaped wave form having portions of different voltage values, said portions of the wave having the same duration and occurring in a given sequence, and means connected to said means producing the step-shaped wave form for applying said wave form in phase opposition to the two grids.

3. A color television camera device as claimed in claim 2, in which the duration of each portion of the step-shaped wave form is substantially equal to the time required for scanning one line of the target plate.

4. A color television camera device as claimed in claim 2, in which the duration of each portion of the step-shaped wave form is substantially equal to the time required for scanning one frame of the target plate.

5. A color television camera device comprising a color filter constituted by a plurality of strips having different color absorption properties and periodically occurring in a given sequence, a photo-cathode sensitive to light rays passing through said filter, a target plate, a field electrode integral with said target plate, a first source of potential, an electron gun including a cathode and an accelerating anode for producing an electron beam, means connected to said first source for applying a given potential to said cathode, a first grid comprising a plurality of parallel wires mounted between said accelerating anode and said field electrode, a second grid comprising a plurality of parallel wires mounted between said first grid and said field electrode, each of the wires of said second grid being parallel to the wires of said first grid and being located behind the center of an aperture formed by two adjacent wires of said first grid, means connected to said first source for applying potentials to said grids exceeding said given potential, means connected to said first source for applying a potential to said field electrode at least equal to that applied to the grid having the lower potential, deflection means for causing the electron beam to scan the target plate, said field electrode, grids and accelerating anode being spaced apart distances at which, with the potentials applied thereto, the beam forms at least one converging ray having a width measured at right angles to the direction of the grid wires at the area of impact on the target plate which is not more than two-thirds the width thereof measured at the area of the first grid, a second source of alternating control voltage, and means connected to said second source for applying an alternating control voltage to at least one of said grids to effect a displacement of said beam transverse to the direction of the grid wires.

6. A color television camera device comprising a color filter constituted by a plurality of strips having different color absorption properties and periodically occurring in a given sequence, a photo-cathode sensitive to light rays passing through said filter, a target plate, a field electrode integral with said target plate, a first source of potential, an electron gun including a cathode and an accelerating anode for producing an electron beam, means connected to said first source for applying a given potential to said cathode, a first grid comprising a plurality of parallel wires mounted parallel to said strips of said color filter and between said accelerating anode and said field electrode, a second grid comprising a plurality of parallel wires mounted between said first grid and said field electrode, each of the wires of said second grid being parallel to the wires of said first grid and being located behind the center of an aperture formed by two adjacent wires of said first grid, means connected to said first source for applying potentials to said grids exceeding said given potential, means connected to said first source for applying a potential to said field electrode at least equal to that applied to the grid having the lower potential, deflection means for causing the electron beam to scan the target plate, said field electrode, grids and accelerating anode being spaced apart distances at which, with the potentials applied thereto, the beam forms at least one converging ray having a width measured at right angles to the direction of the grid wires at the area of impact on the target plate which is not more than two-thirds the width thereof measured at the area of the first grid, the spacing between the grids being small relative to the spacing between said field electrode and said accelerating anode, a second source of alternating control voltage, and means connected to said second source for applying an alternating control voltage to at least one of said grids to effect a displacement of said beam transverse to the direction of the grid wires.

7. A color television camera device as claimed in claim 6 in which the alternating control voltage is supplied in phase opposition to both of said grids.

References Cited in the file of this patent

UNITED STATES PATENTS

| | | |
|---|---|---|
| 2,446,791 | Schroeder | Aug. 10, 1948 |
| 2,529,485 | Chew | Nov. 14, 1950 |
| 2,532,511 | Okolicsanyi | Dec. 5, 1950 |
| 2,568,448 | Hansen | Sept. 18, 1951 |
| 2,589,386 | Huffman | Mar. 18, 1952 |
| 2,619,608 | Rajchman | Nov. 25, 1952 |